(12) United States Patent
Hansen

(10) Patent No.: US 7,900,710 B2
(45) Date of Patent: Mar. 8, 2011

(54) POWER CUP CUTTER

(76) Inventor: Michael B. Hansen, Lava Hot Springs, ID (US)

( * ) Notice: Subject to any disclaimer, the term of this patent is extended or adjusted under 35 U.S.C. 154(b) by 43 days.

(21) Appl. No.: 11/983,681

(22) Filed: Nov. 9, 2007

(65) Prior Publication Data

US 2009/0120655 A1    May 14, 2009

(51) Int. Cl.
*A01B 45/00*    (2006.01)
(52) U.S. Cl. .............................. 172/22; 408/68
(58) Field of Classification Search .............. 172/21, 172/22; 408/68, 204, 205, 206
See application file for complete search history.

(56) References Cited

U.S. PATENT DOCUMENTS

| | | | | |
|---|---|---|---|---|
| 1,692,436 A * | 11/1928 | Deane | ............................ | 111/101 |
| 3,356,168 A * | 12/1967 | Johnson | ........................ | 175/394 |
| 3,416,831 A | 12/1968 | Bishop et al. | | |
| 3,444,938 A * | 5/1969 | Ballmann | ...................... | 111/101 |
| 4,156,469 A * | 5/1979 | Laskey | ............................ | 175/58 |
| 4,204,577 A | 5/1980 | Bittle | | |
| 4,403,665 A * | 9/1983 | Bodine | ........................... | 175/55 |
| 4,653,336 A * | 3/1987 | Vollweiler | .................. | 73/864.44 |
| 4,718,291 A * | 1/1988 | Wood et al. | ................... | 74/89.23 |
| 4,763,735 A | 8/1988 | Gay | | |
| 4,779,689 A * | 10/1988 | Paxton, III | ..................... | 175/403 |
| 4,884,638 A * | 12/1989 | Hoffman | ......................... | 172/22 |
| 4,947,938 A * | 8/1990 | Fricke et al. | ..................... | 172/22 |
| 4,958,688 A | 9/1990 | Marrow et al. | | |
| 4,974,682 A * | 12/1990 | Hoffman | ......................... | 172/22 |
| 5,088,562 A * | 2/1992 | Shields | ............................ | 172/22 |
| 5,096,341 A * | 3/1992 | Despres | ........................... | 408/68 |
| 5,152,329 A * | 10/1992 | Browne et al. | ................. | 144/356 |
| 5,337,831 A | 8/1994 | Chopp | | |
| 5,435,672 A * | 7/1995 | Hall et al. | ....................... | 408/68 |
| 5,542,476 A * | 8/1996 | Hansen | ............................ | 172/22 |
| 5,662,179 A | 9/1997 | Falk | | |
| 5,669,648 A * | 9/1997 | Luck | ............................ | 294/50.8 |
| 5,795,110 A * | 8/1998 | Wirth et al. | ..................... | 408/110 |
| 5,882,151 A * | 3/1999 | Wirth et al. | ..................... | 408/110 |
| 6,003,892 A * | 12/1999 | Henson | .......................... | 280/504 |
| 6,386,294 B1 * | 5/2002 | Best | ............................... | 172/22 |
| 6,739,401 B1 * | 5/2004 | Sova | ............................... | 172/22 |
| 6,758,244 B2 * | 7/2004 | Workman et al. | ............... | 138/89 |
| 6,857,830 B2 * | 2/2005 | Holcomb | ....................... | 408/204 |
| 6,955,227 B1 * | 10/2005 | Motosko | ......................... | 172/25 |
| 7,001,119 B2 * | 2/2006 | Wendzina et al. | ............ | 408/204 |
| 2008/0179099 A1 * | 7/2008 | McNulty | ........................ | 175/162 |

* cited by examiner

*Primary Examiner* — Thomas B Will
*Assistant Examiner* — Jamie L McGowan
(74) *Attorney, Agent, or Firm* — Morriss O'Bryant Compagni, PC

(57) ABSTRACT

There is provided an improved, simple and effective, powered hole-cutting apparatus, otherwise referred to as a power cup cutter, comprised of a USGA approved cutting cylinder modified with an internal plunger and an elongated threaded rod, whereby the cutting cylinder is driven into the soil by the rotation of the rod which is attached to an electric drill for easy and effortless cutting of a hole on golf course greens. With a straightforward reversal of the drill rotation, extraction of the soil plug from the newly formed hole and subsequent insertion of the soil plug into the previous hole will restore the golf course greens for golf play.

The ability to cut holes quickly and efficiently is essential for golf course maintenance, but contemporary manual-operated cup cutters have fallen short of offering an efficient means of both the extraction and the insertion of the soil plug. Current methods are highly labor-intensive and require 25-30 minutes for each hole. This invention adds power to both the cutting and ejection of the soil plug from the soil as well as the subsequent insertion of the soil plug into the former hole and requires a mere 5-10 minutes a hole.

The field efficiency of the power cup cutter will effectively replace the need for and use of conventional golf cup cutters.

20 Claims, 3 Drawing Sheets

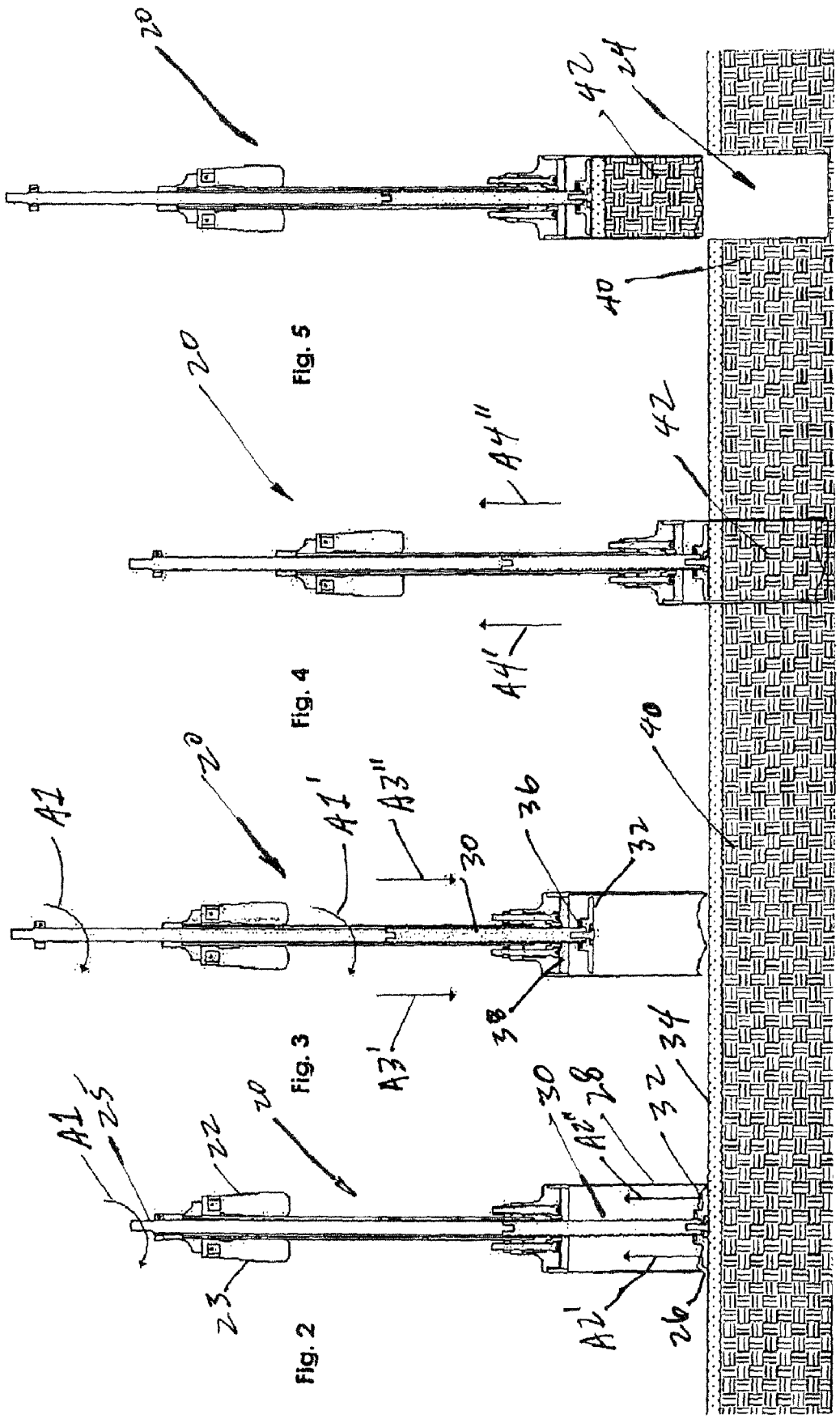

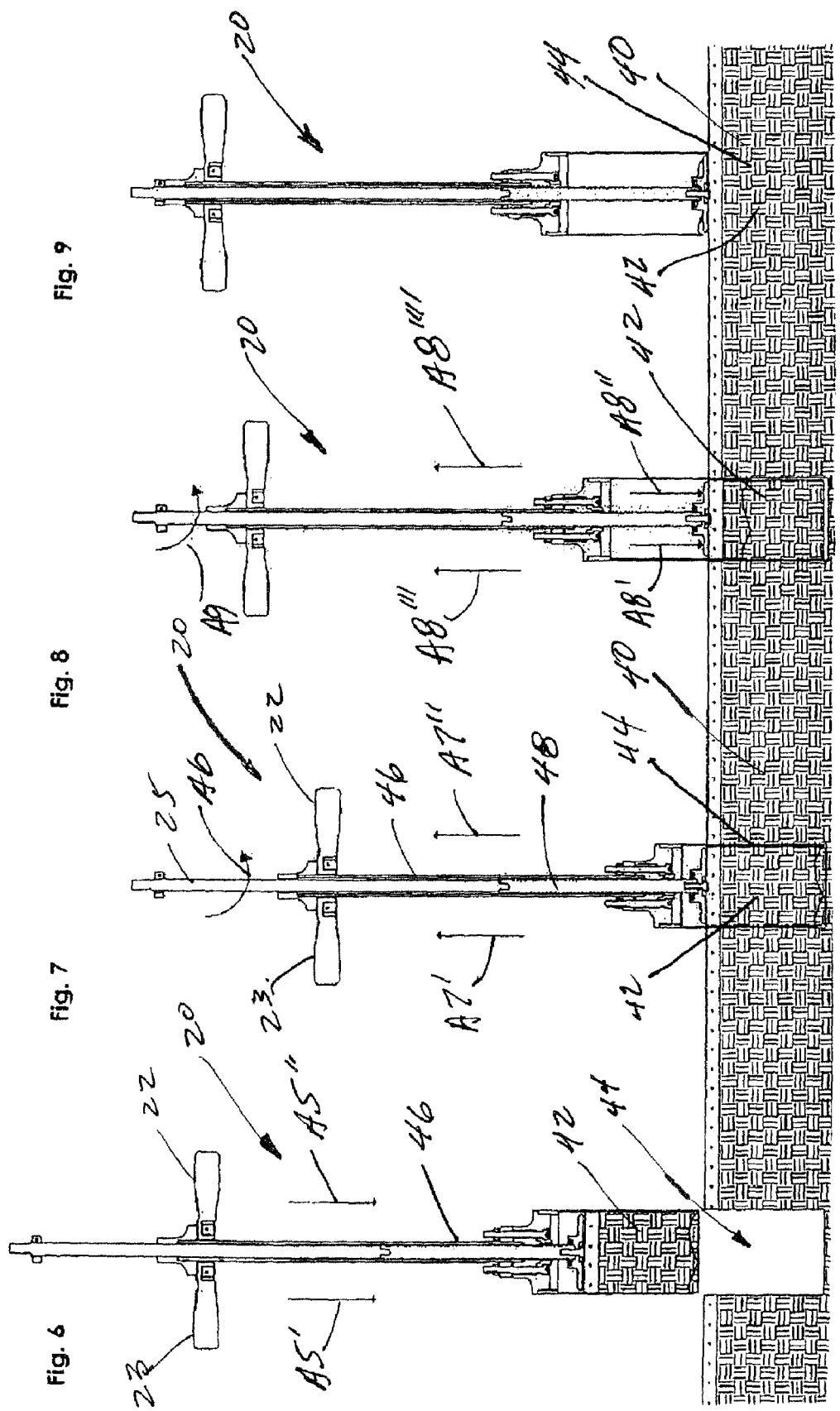

POWER CUP CUTTER

BACKGROUND OF THE INVENTION

1. Field of Invention

The relocation of holes on the golf greens is part of the daily maintenance procedures for most golf courses. Wear, variety, turf conditions and the ability to maintain or increase the challenge of the course are factors that influence the regularity of relocation of the holes in the greens. The daily cutting of said holes is time-consuming (25-30 minutes a hole) and costly for maintenance personnel, so finding a quick, efficient means of creating said holes is important for efficiency. The concept of a cutting cylinder which is forced downwardly into the soil below the turf and then moved upwardly to form a hole in the ground is not a new idea. In fact, variations of cup cutter's have long been the preferred method for use in placing holes in golf greens. Over the years, various ideas have been put forth for both manual and power-driven, hand-held apparatuses as well as ideas for mobile machines, but all fall short. They either disturb the green over much with their cutting motion, their size and/or their weight; or are too noisy to allow undisturbed golf.

The most conventional method used today is a manual hand-held apparatus. The use of these manual conventional cup cutters have drawbacks which can lead to the undesirable result of out-of-round, oversized diameter, and rutted holes.

The primary objective of this present invention is to move past the drawbacks of previous cup cutter attempts and expand on the conventional cup cutter by developing a quick, accurate, power-driven cup cutter that can accurately cut out and eject soil plugs as well as inject the soil plug into the former hole in a manner which doesn't adversely affect the adequacy of the golf greens.

Powered by an electric drill, the unique design of the internal plunger within the device allows the clean and complete ejection of cuts from the soil and for easy injection of the soil plug into the former hole.

2. Description of Prior Art

U.S. Pat. No. 3,416,831, issued Dec. 17, 1968, to Bishop, et al., relates to a manual-powered golf hole cutting apparatus which focuses on a central rod in the cutter head which is used to break any vacuum created when pulling the soil plug from the hole.

U.S. Pat. No. 4,204,577, issued May 25, 1980, to Bittle, relates to another manual-powered hole cutter which is primarily concerned with protection of the surface of the green in the area in which the hole is to be cut.

U.S. Pat. No. 4,763,735, issued Aug. 16, 1988, to Gay, relates to a mobile machine for making holes in greens. The cutting apparatus is powered through a hydraulic circuit connected to a mower with a focus on being able to orient the cutting assembly in a vertical plane on the green regardless of its slope. The patent also addresses the issue of injection of the soil plug directly into the prior hole, but the weight and size of the machine makes it impracticable for golf green maintenance.

U.S. Pat. No. 4,958,688, issued Sep. 25, 1990, to Marrow, et al., relates to a power-driven golf hole cutting apparatus with a plunger for soil plug injection. The design has a high probability of binding up because of the proposed internal threading and the use of a combustion engine introduces the likelihood of motor oil burn on the greens.

U.S. Pat. No. 5,337,831, issued Aug. 16, 1994, to Chopp, relates to another power-driven golf cup cutter apparatus, which offers a powered extraction of soil plug but the insertion of soil plug into the old hole must be done manually. This design also proposes a combustion engine and will likely cause motor oil burn on the greens.

U.S. Pat. No. 5,662,179, issued Sep. 2, 1997, to Falk, relates to a manual-driven golf cup cutter which uses a form of percussion weight, or hammering, to drive the device into the ground and the ejection of the soil from the device is done by pushing a two-arm lever downward.

The present invention has been designed to replace the conventional manual-operated cup cutter and to move past the drawbacks of previous cup cutter attempts by developing a quick, accurate, power-driven cup cutter that can accurately cut out and eject soil plugs as well as inject the soil plug in a manner which doesn't adversely affect the adequacy of the golf greens. The continuous threaded rod of the internal components will eliminate binding when the drill is going both forward and reverse.

SUMMARY OF THE INVENTION

The present invention provides an improved, simple and effective, powered hole-cutting apparatus, more particularly a power golf cup cutter, comprised of a USGA approved cutting cylinder modified with an internal plunger and an elongated threaded rod, whereby the cutting cylinder is driven into the soil by the rotation of the rod which is attached to an electric drill for easy and effortless cutting of a hole on golf course greens. With a straightforward reversal of the drill rotation, extraction of the soil plug from the newly formed hole and subsequent insertion of the soil plug into the previous hole will restore the golf course greens for golf play.

The main attribute of this invention lies in its ability to be power-driven both for the extraction and the reinsertion of the soil plug. The field efficiency of the powered cup cutter will effectively replace the need for and use of conventional manual-operated cup cutters and have added a new level of efficiency for powered apparatuses.

Benefits of this invention include:

A depth gauge to avoid soil compression

Reverse of the drill releases the internal threaded rod to allow for the plunger to push the soil plug out, completely in tack for easy replacement into the previous hole Thrust bearings to avoid the threads inside from binding and locking up against the outer section User-friendly Lightweight Low noise level output (no rattling or hammering noises)

BRIEF DESCRIPTION OF DRAWINGS

FIG. 2 shows the power cup cutter in its beginning position handles down ready to cut a new hole. At this point the operator turns the chuck shaft with a drill in a clockwise direction. By so doing they engage the teeth of the 4.25 inch USGA approved cutting cylinder into the soil until they meet enough resistance to stop. Once the cutting cylinder stops, the left-hand elongated threaded rod is engaged and begins to move up bringing the internal plunger off of the ground surface.

FIG. 3 is a depiction of the power cup cutter once the internal plunger and the left-hand elongated threaded rod have obtained full upward stroke thus engaging the needle roller thrust bearings against the left-hand threaded nut. At this point the left-hand elongated threaded rod can no longer progress upward and forces the entire power cup cutter to rotate in the clockwise direction causing it to cut through and progress into the soil.

FIG. 4 is a view of the power cup cutter after reaching its full penetration potential. At this point the operator simply pulls the apparatus along with the soil plug straight up out of the ground.

FIG. 5 shows the power cup cutter and soil plug after removal from the ground.

FIG. 6 is a depiction of the power cup cutter now over the old hole which is to be inserted with the soil plug. During this process the handles could be brought into the horizontal position in order to help drop the soil plug into its necessary position with ease.

FIG. 7 is of the power cup cutter and the soil plug inserted within the old hole. At this point the operator must have the handles in the horizontal position for the purpose of holding the outer body of the device in place while turning the chuck shaft with a motor in a counter clockwise direction. The center shaft will then break free of the bind on the outer body and begin to push the soil plug out while simultaneously lifting itself out of the ground.

FIG. 8 is a depiction of the power cup cutter in process of pushing out the soil plug.

FIG. 9 shows the apparatus now in its finished position out of the ground with the soil plug in the old hole.

DETAILED DESCRIPTION OF THE PREFERRED EMBODIMENTS

Figure 1:
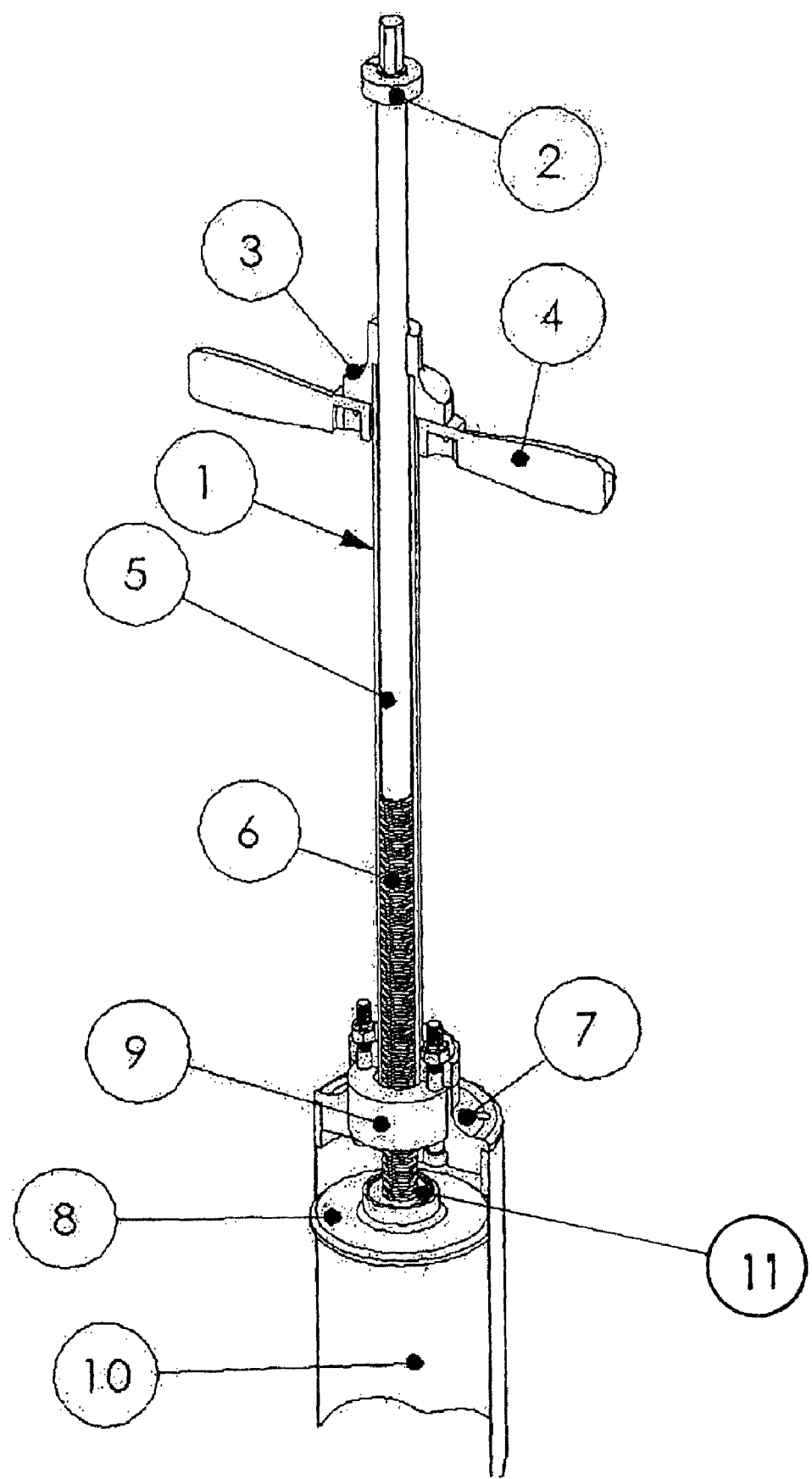
FIG. 1 is a perspective view of the assembled apparatus of a preferred embodiment of the present invention.

The apparatus consists of an outer body and an inner body. The base of the outer body consists of a main shaft (1) that bolts to the cup lid (7) which is formed and bolted to the cup cutter (10). The top of the outer body consists of a handle support (3) welded to the main shaft (1) in order to allow the handles (4) to be welded to the top of the main shaft (1) for use during operation. Seated within the cup lid (7) of the outer body there is an ACME left-hand threaded nut (9) to allow the inner body to move in a controlled fashion with respect to the outer body. ACME threading allows for the best transfer of rotational energy into linear energy.

The inner body consists of five principle parts: an ACME left-hand threaded rod (6), a chuck shaft (5), a shaft collar (2), an internal plunger (8), and needle thrust bearings (11). The ACME left-hand threaded rod (6) sits inside of the main shaft (1) and is welded to the bottom of the chuck shaft (5), creating one elongated member. The chuck shaft (5) protrudes out the top of the main shaft (1) where a motor (not shown) could be attached to the end. Welded to the top of the chuck shaft (5) is a shaft collar (2). The shaft collar (2) is attached through an aperture in the handle support (3). At the bottom of the ACME left-hand threaded rod (6) the internal plunger (8) is bolted on through an aperture on the internal plunger (8). The internal plunger (8), which is nearly 4 inches in diameter, is designed to have maximum surface contact possible to avoid any dimpling of the soil plug. Seated inside of the internal plunger (8) are the needle thrust bearings (11). Needle thrust bearings (11) can handle higher loads than most thrust bearings and since ACME threading can transmit energy well, there could be high impact loads that come into contact with the thrust bearings when the inner body is being threaded up quickly and suddenly has to stop due to contact between the thrust bearings (11) on the inner body and the ACME left-hand threaded nut (9) of the main shaft (1). The needle thrust bearings (11) also serve the purpose of allowing the inner body to immediately break free of the outer body when the time comes to run the inner body down through the outer body and push the soil plug out. The shaft collar (2) at the top of the inner body keeps the user from running the inner body too far out through the outer body (1) to where the chuck shaft (5) would come into contact with the ACME left-hand threaded nut (9) and lock the two bodies together.

FIG. 2 shows the power cup cutter 20 in its beginning position handles 22 and 23 down ready to cut a new hole 24 (see FIG. 5). At this point the operator turns the chuck shaft 25 (as indicated by arrow A1) with a drill (not shown) in a clockwise direction. By so doing the user engages the teeth 26 of the 4.25 inch USGA approved cutting cylinder 28 into the soil 30 until the teeth 26 meet enough resistance to stop. Once the cutting cylinder 28 stops, the left-hand elongated threaded rod 30 is engaged and begins to move up, as indicated by arrows A2' and A2" bringing the internal plunger 32 off of the ground surface 34.

FIG. 3 is a depiction of the power cup cutter 20 once the internal plunger 32 and the left-hand elongated threaded rod 30 have obtained full upward stroke thus engaging the needle roller thrust bearings 36 against the left-hand threaded nut 38. At this point the left-hand elongated threaded rod 30 can no longer progress upward and forces the entire power cup cutter 20 to rotate in the clockwise direction (as indicated by arrows A1 and A1' causing it to cut through and progress into the soil 40 as indicated by arrows A3' and A3".

FIG. 4 is a view of the power cup cutter 20 after reaching its full penetration potential. At this point, the operator simply pulls the cup cutting apparatus 20 along with the soil plug 42 straight up out of the ground as indicated by arrows A4' and A4".

FIG. 5 shows the power cup cutter 20 and soil plug 42 after removal from the ground 40.

FIG. 6 is a depiction of the power cup cutter 20 now over the old hole 44 which is to be inserted, as shown by arrows A5' and A5" with the soil plug 42. During this process, the handles 22 and 23 could be brought into the horizontal position in order to help drop the soil plug 42 into its necessary position with ease.

FIG. 7 shows the power cup cutter 20 and the soil plug 42 inserted within the old hole 44. At this point, the operator has the handles 22 and 23 in the horizontal position for the purpose of holding the outer body 46 of the cup cutter 20 in place while turning the chuck shaft 25 with a motor in a counter clockwise direction as shown by arrow A6. The center shaft 48 will then break free of the bind on the outer body 46 and begin to push the soil plug 42 out while simultaneously lifting itself, as shown by arrows A7' and A7" out of the ground 40.

FIG. 8 is a depiction of the power cup cutter 20 in the process, as shown by arrow A9 of pushing out the soil plug 42 as indicated by arrows A8', A8", A8''' and A8''''.

FIG. 9 shows the cup cutting apparatus 20 now in its finished position out of the ground with the soil plug 42 in the old hole 44.

Thus it is seen that the present invention provides a golf cup cutting apparatus which, due to its distinctive design, permits a user to quickly cut holes in the golf green and efficiently replace the soil plug into the previous hole, all to a consistent depth and in a precise manner that reduces soil compression of the plug.

As is noticeable from the preceding specifications, with very little modification, the invention is suitable for a variety of alternative activities which requires the removal of a relatively small amount of soil and the ability to replace such soil, including the transplanting of small plants and the planting of bulbs, among other activities. It should also be understood that modifications made which may differ particularly from those which have been described in the preceding specification and description, but which do not affect the integrity of the invention, are reasonable and proper within the scope of the invention.

The invention claimed is:

1. An apparatus for cutting golf holes, comprising:
a cup cutter;
a threaded nut fixedly attached to a top of the cup cutter;
a hollow shaft having a first end fixedly coupled to the top of the cup cutter such that rotation of said hollow shaft causes corresponding rotation of said cup cutter;
a plunger disposed within said cup cutter; and
a threaded drive shaft disposed within said hollow shaft and threadedly coupled to said threaded nut, said drive shaft having a first end coupled to the plunger and a second end configured for coupling to a motor and being rotatable thereby so that rotation of said drive shaft relative to said hollow shaft in a first direction moves said plunger upwardly within said cup cutter without rotating said cup cutter until said plunger reaches the top of the cup cutter whereby further rotation of said drive shaft in the first direction causes rotation of the cup cutter for cutting soil with the plunger being retracted within the cup cutter so that the plunger is not in contact with the soil when cutting the soil and rotation of said drive shaft relative to said hollow shaft in a second direction opposite to said first direction causes said drive shaft to rotate relative to said threaded nut thereby moving said plunger downwardly within said cup cutter without rotating said cup cutter to force out the soil contained within said cup cutter.

2. The apparatus of claim 1, further comprising thrust bearings coupled to a top side of said plunger for engaging said top of said cup cutter when said plunger is fully retracted within said cup cutter, said thrust bearings allowing said drive shaft to break free from said hollow shaft when said plunger engages said top of said cup cutter.

3. The apparatus of claim 1, further comprising a pair of handles coupled proximate to a second end of said hollow shaft for grasping by a user to lift said cup cutter and to allow the user to prevent rotation of said hollow shaft relative to said drive shaft when rotating said drive shaft in the first or second direction.

4. The apparatus of claim 3, wherein said pair of handles is selectively foldable between an extended position and a downwardly folded position.

5. The apparatus of claim 4, further comprising a handle support defining an aperture attached to the second end of the hollow shaft, said drive shaft passing through said aperture and said pair of handles being pivotably coupled to said handle support.

6. The apparatus of claim 1, wherein said threaded nut comprises a left-handed threaded nut and said drive shaft has left handed threads disposed thereon, said left handed threads engaging said nut whereby rotation of said drive shaft relative to said nut causes said plunger to move longitudinally within said cup cutter unless said plunger is fully retracted within said cup cutter.

7. The apparatus of claim 1, wherein said drive shaft comprises a chuck shaft defining a first portion and an externally threaded rod defining a second portion, said first portion having an end configured for attachment to an electrically powered hand drill for driving said drive shaft and said second portion threadedly engaging said nut.

8. The apparatus of claim 1, further comprising a shaft collar attached to the top portion of the drive shaft, said shaft collar positioned on said drive shaft to abut against the second end of the hollow shaft when said plunger is extended to a position proximate an open end of said cup cutter.

9. The apparatus of claim 8, wherein said shaft collar prevents said drive shaft from locking to the nut.

10. The apparatus of claim 9, wherein said shaft collar and a top of said plunger are spaced to provide a depth gauge to ensure proper extraction and insertion of a soil plug.

11. The apparatus of claim 10, wherein said shaft collar and said plunger prevent binding between the nut and the drive shaft when said plunger is fully extended or fully retracted.

12. An apparatus for cutting golf holes, comprising:
a cup cutter;
a hollow shaft having a first end fixedly coupled to the top of the cup cutter such that rotation of said hollow shaft causes corresponding rotation of said cup cutter;
a threaded nut fixedly coupled relative to said cup cutter such that rotation of said threaded nut causes a corresponding rotation of said cup cutter and said hollow shaft;
a plunger disposed within said cup cutter and longitudinally movable therein; and
a drive shaft being at least partially threaded, disposed within said hollow shaft and threadedly coupled to said threaded nut, said drive shaft having a first end coupled to the plunger and a second end configured for coupling to a motor and being rotatable thereby so that rotation of said drive shaft relative to said hollow shaft in a first direction moves said plunger upwardly within said cup cutter without rotating said cup cutter until said plunger reaches the top of the cup cutter whereby further rotation of said drive shaft in the first direction causes corresponding rotation of said hollow shaft and the cup cutter for cutting soil, with the plunger being retracted within the cut cutter so that the plunger is not in contact with the soil when the soil is being cut, and rotation of said drive shaft relative to said hollow shaft in a second direction opposite to said first direction causes said drive shaft to rotate relative to said threaded nut thereby moving said plunger downwardly within said cup cutter without rotating said cup cutter to force the soil out of said cup cutter.

13. The apparatus of claim 12, wherein said drive shaft and said hollow shaft are selectively engageable relative to one another to cause said hollow shaft to rotate with drive shaft, whereby rotation of said drive shaft causes rotation of said cup cutter.

14. The apparatus of claim 12, further comprising thrust bearings coupled to a top side of said plunger for engaging said top of said cup cutter when said plunger is fully retracted within said cup cutter, said thrust bearings allowing said drive shaft to break free from said hollow shaft when said plunger engages said top of said cup cutter.

15. The apparatus of claim 12, further comprising a pair of handles coupled proximate to a second end of said hollow shaft for grasping by a user to lift said cup cutter and to allow the user to prevent rotation of said hollow shaft relative to said drive shaft when rotating said drive shaft in the first or second direction.

16. The apparatus of claim 15, wherein said pair of handles is selectively foldable between an extended position and a downwardly folded position.

17. The apparatus of claim 16, further comprising a handle support defining an aperture attached to the second end of the hollow shaft, said drive shaft passing through said aperture and said pair of handles being pivotably coupled to said handle support.

18. The apparatus of claim 12, wherein said threaded nut comprises a left-handed threaded nut and said drive shaft has left handed threads disposed thereon, said left handed threads engaging said nut whereby rotation of said drive shaft relative to said nut causes said plunger to move longitudinally within said cup cutter unless said plunger is fully retracted within said cup cutter.

19. The apparatus of claim 12, wherein said drive shaft comprises a chuck shaft defining a first portion and an externally threaded rod defining a second portion, said first portion having an end configured for attachment to an electrically powered hand drill for driving said drive shaft and said second portion threadedly engaging said nut.

20. The apparatus of claim 12, further comprising a shaft collar attached to the top portion of the drive shaft, said shaft collar positioned on said drive shaft to abut against the second end of the hollow shaft when said plunger is extended to a position proximate an open end of said cup cutter and to prevent said drive shaft from locking to the nut.

* * * * *